United States Patent
Yamada et al.

(10) Patent No.: US 7,337,661 B2
(45) Date of Patent: Mar. 4, 2008

(54) THERMAL FLUID FLOW METER HAVING HEAT-GENERATING RESISTOR AND TEMPERATURE ADJUSTER THEREFOR

(75) Inventors: Masamichi Yamada, Hitachinaka (JP); Masahiro Matsumoto, Hitachi (JP); Hiroshi Nakano, Hitachi (JP); Izumi Watanabe, Hitachinaka (JP); Keiichi Nakada, Hitachinaka (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 11/352,212

(22) Filed: Feb. 13, 2006

(65) Prior Publication Data
US 2006/0207320 A1    Sep. 21, 2006

(30) Foreign Application Priority Data
Mar. 18, 2005    (JP) ............................. 2005-078380

(51) Int. Cl.
*G01F 1/68*    (2006.01)
(52) U.S. Cl. .................. 73/204.26; 73/204.15
(58) Field of Classification Search ............. 73/204.26, 73/204.15
See application file for complete search history.

(56) References Cited

U.S. PATENT DOCUMENTS

| | | | |
|---|---|---|---|
| 4,683,858 A | 8/1987 | Sato et al. | |
| 4,739,657 A | 4/1988 | Higashi et al. | |
| 5,369,994 A | 12/1994 | Hecht et al. | |
| 6,357,294 B1 * | 3/2002 | Nakada | 73/204.26 |
| 6,923,053 B2 * | 8/2005 | Yamada et al. | 73/204.26 |
| 2004/0040377 A1 | 3/2004 | Tanimoto et al. | |

FOREIGN PATENT DOCUMENTS

| | | |
|---|---|---|
| EP | 1 316 781 A | 6/2003 |
| EP | 1 348 937 A | 10/2003 |
| JP | 33342926 | 8/2002 |

* cited by examiner

Primary Examiner—Harshad Patel
(74) Attorney, Agent, or Firm—Mattingly, Stanger, Malur & Brundidge, P.C.

(57) ABSTRACT

A low-cost thermal flow meter that has good temperature characteristics and little variations. The thermal flow meter includes a sensor element including a heat-generating resistor and at least two temperature-measuring resistors disposed downstream and upstream. The sensor element is positioned in the flow of a measured medium. It also includes an adjusting means for adjusting a excess temperature ($\Delta Th = Th - Ta$) of the heat-generating resistor, which is the difference between the temperature ($Ta$) of the measured medium and the temperature ($Th$) of the heat-generating resistor. The adjusting means adjusts the excess temperature ($\Delta Th$) of the heat-generating resistor depending on the temperature of the measured medium such that the excess temperature becomes smaller as the temperature of the measured medium increases.

9 Claims, 6 Drawing Sheets

PRIOR ART

THERMAL FLUID FLOW METER HAVING HEAT-GENERATING RESISTOR AND TEMPERATURE ADJUSTER THEREFOR

BACKGROUND OF THE INVENTION

1. Field of the Invention

The invention relates to a device for detecting flow rates and particularly to a flow sensor in an internal combustion engine or a flow sensor used in fuel cell systems.

2. Background Art

Air flow sensors are disposed in the intake air passage of internal combustion engines, such as those in automobiles, for measuring the intake air amount. Thermal types are becoming more and more mainstream because of their ability to directly detect mass air amounts. In recent years, particularly, those airflow sensors manufactured with the semiconductor micromachining technology have been gaining attention because of their fast response and their ability to detect backflow by utilizing such fast response.

A conventional example of technology related to thermal airflow sensors utilizing semiconductor substrates is disclosed in Patent Document 1. In this example, a heating resistor disposed between an upstream temperature-measuring resistor and a downstream temperature-measuring resistor is heated by a current that is caused to flow therethrough, whereby a flow rate signal based on the difference between the outputs of the upstream and downstream temperature-measuring resistors is obtained.

In the technique disclosed in Patent Document 1, in order to correct the temperature dependency of the characteristic curve of the thermal airflow sensor in a more preferable manner, the excess temperature of the heat-generating resistor—namely, its temperature difference with respect to the temperature of the measured medium—is adjusted such that it becomes higher as the temperature of the measured medium increases, in consideration of the influence of the temperature dependencies of the thermal conductivity, thermal capacity, and viscosity of the measured medium.

However, in the above conventional example, sufficient consideration is not given to the characteristics (particularly the temperature dependency of resistance values) of the materials of which the upstream and the downstream temperature-measuring resistors are made. Thus, the temperature dependency of the characteristic curve of the thermal airflow sensor is insufficient.

Patent Document 1: JP Patent No. 3342926

SUMMARY OF THE INVENTION

The conventional technique has the following problems. FIG. 10 shows a sensor element in the thermal airflow sensor disclosed in Patent Document 1.

In the figure, numeral 2 designates a Si semiconductor substrate, 3 a dielectric membrane (diaphragm) formed over a cavity (not shown) formed in the Si semiconductor substrate, 4 a heat-generating resistor, 5 a heat-generating/temperature-measuring resistor for measuring the temperature of the heat-generating resistor, 6a and 6c an upstream temperature-measuring resistor and a downstream temperature-measuring resistor disposed upstream and downstream of the heat-generating resistor, respectively, and 8 a medium temperature-measuring resistor for measuring the temperature of a measured medium 7.

In the conventional example, the resistors are constructed of platinum thin films. The temperature dependency of the resistance value of a platinum thin film is approximated by a quadratic expression according to the following equation (1):

$$R(T)=R(0° \text{ C.}) (1+\alpha1 \times T+\alpha2 \times T^2) \qquad (1)$$

where a first-order resistor temperature coefficient ($\alpha1$) assumes a positive value and a second-order resistor temperature coefficient ($\alpha2$) assumes a negative value.

Because a flow rate signal is obtained from an output signal that corresponds to the temperature difference between the upstream temperature-measuring resistor 6a and the downstream temperature-measuring resistor 6c, the temperature characteristic of the output signal is strongly dependent on the second-order resistor temperature coefficient ($\alpha2$).

In the case of the platinum thin film of the conventional example, because the second-order resistor temperature coefficient ($\alpha2$) takes a negative value, the output signal becomes smaller as the temperature (Ta) of the measured medium 7 increases, leading to deterioration in temperature characteristics. In order to correct for this, the conventional example is adjusted such that the excess temperature ($\Delta$Th=Th−Ta) increases as the temperature of the measured medium increases.

In the conventional example, however, sufficient consideration is not given to resistors made of materials other than platinum thin films. For example, a silicon (Si) semiconductor thin film, which is used in the present invention, is a lower-cost material than platinum thin films with a positive second-order resistor temperature coefficient ($\alpha2$), which is opposite to the sign of the platinum thin film.

If the silicon (Si) semiconductor thin film used in the invention were to be adjusted such that the excess temperature ($\Delta$Th) increases as the temperature of the measured medium increases, as in the conventional example, the output signal would be excessive and the temperature characteristics would further deteriorate.

Furthermore, the conventional example employs a bridge circuit as a drive circuit for the heat-generating resistor and as a detection circuit for the temperature-measuring resistor. The bridge circuit includes fixed resistors (printed resistors) in addition to the platinum resistors. As a result, if the ambient temperature changes, variations occur in the heating temperature of the heat-generating resistor and in the output signal of the temperature-measuring resistor due to variations in the resistor temperature coefficients of the fixed resistors, providing a major factor of temperature characteristic variations.

Thus, it is an object of the invention to provide a low-cost thermal flowmeter that overcomes the aforementioned problems and that has good temperature characteristics and little variations.

The above object is achieved by the invention recited in the claims.

The invention provides a thermal flow meter comprising:

a sensor element positioned in the flow of a measured medium, the sensor element having at least one heat-generating resistor and at least two temperature-measuring resistors, the heat-generating resistor being disposed such that it can heat the temperature-measuring resistors, wherein the at least one temperature-measuring resistor is positioned upstream of the heat-generating resistor and the at least one temperature-measuring resistor is positioned downstream of the heat-generating resistor;

an evaluation means that forms a sensor signal by measuring a signal from the temperature-measuring resistor; and an adjusting means for adjusting an excess temperature (ΔTh=Th−Ta) of the heat-generating resistor, which is the difference between the temperature (Ta) of the measured medium and the temperature (Th) of the heat-generating resistor, wherein the adjusting means adjusts the excess temperature of the heat-generating resistor depending on the temperature of the measured medium such that the excess temperature becomes lower as the temperature of the measured medium increases, whereby a thermal flow meter that has good temperature characteristics can be provided.

In accordance with the invention, a thermal flow meter can be provided that has good temperature characteristics and little variations and that is low-cost. The thermal flow meter includes a sensor element that is formed of at least two temperature-measuring resistors disposed downstream and upstream and that is positioned in the flow of a measured medium. It also includes an adjusting means for adjusting the excess temperature (ΔTh=Th−Ta) of the heat-generating resistor, which is the difference between the temperature (Ta) of the measured medium and the temperature (Th) of the heat-generating resistor. The adjusting means adjusts the excess temperature (ΔTh) of the heat-generating resistor depending on the temperature of the measured medium such that the excess temperature becomes smaller as the temperature of the measured medium increases.

DESCRIPTION OF PREFERRED EMBODIMENTS

A thermal flowmeter according to the invention will be described by way of embodiments thereof with reference to the drawings.

Figure 1:
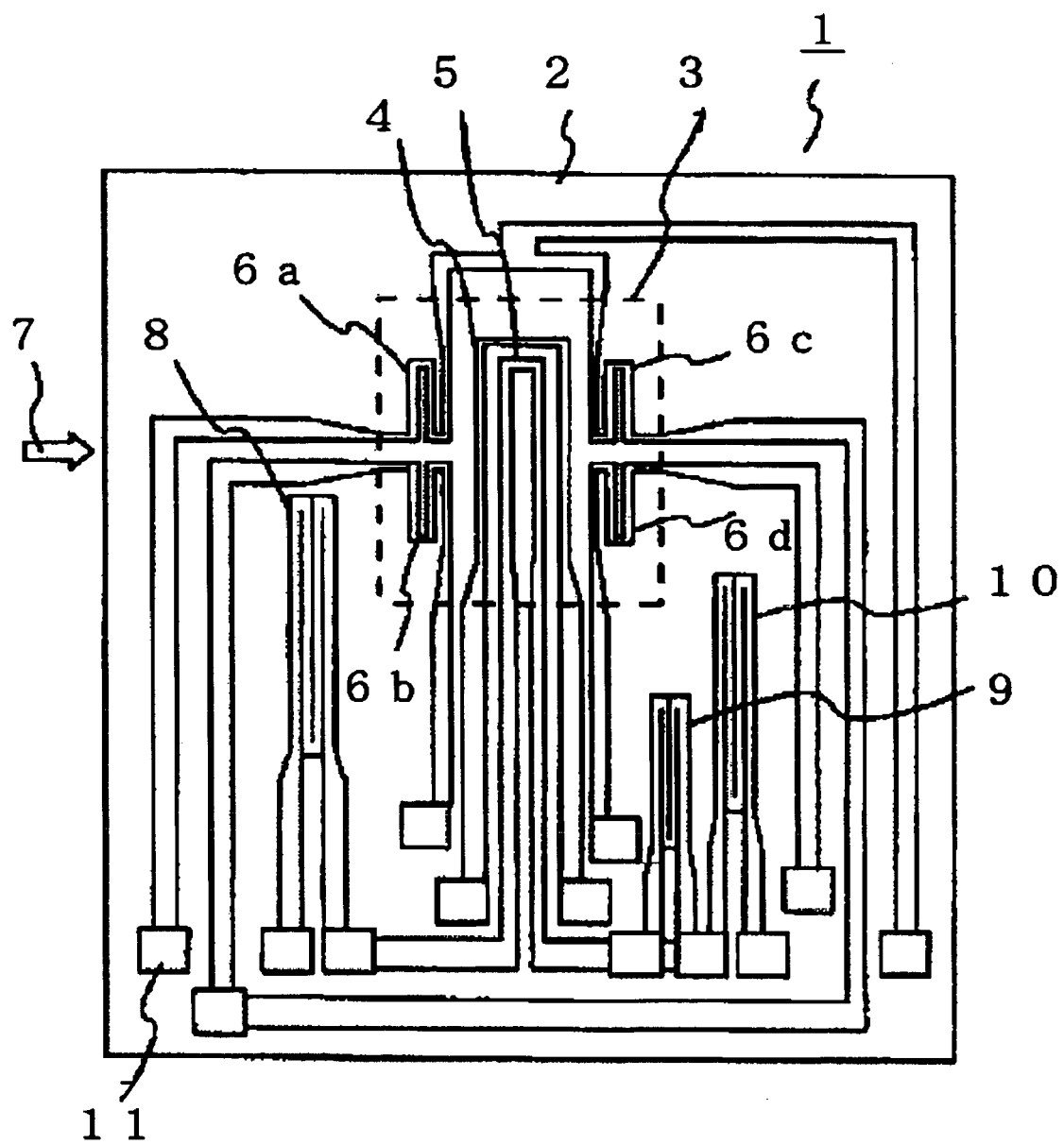
FIG. 1 shows a plan view of a sensor element in a thermal flow meter according to an embodiment of the invention.

FIG. 1 shows a plan view of a sensor element of the thermal flowmeter according to an embodiment of the invention. Numeral 1 designates a sensor element, of which the entirety is formed on a semiconductor substrate 2 as a base.

The semiconductor substrate 2 is comprised of a monocrystalline silicon (Si) plate in which a cavity (not shown) are formed. On one side of the substrate (upper surface in the drawing), there is formed a diaphragm portion 3. The a cavity is formed as openings with a substantially rectangular shape in a plan view.

An dielectric membrane on one side of the semiconductor substrate 2 covers the entire surface of the semiconductor substrate 2 including the a cavity. On the surface of the dielectric membrane, of which the diaphragm portion 3 is formed, there are formed a heat-generating resistor 4, a heat-generating/temperature-measuring resistor 5, upstream temperature-measuring resistors 6a and 6b, and downstream temperature-measuring resistors 6c and 6d. On the semiconductor substrate 2 around the diaphragm portion 3, there are formed a medium-temperature-measuring resistor 8 for measuring the temperature of a measured medium 7, a first circuit resistor 9 and a second circuit resistor 10 of which resistors of a bridge circuit are formed, and terminal electrodes 11 for providing electrical connection with outside circuitry.

The heat-generating resistor 4, heat-generating/temperature-measuring resistor 5, temperature-measuring resistors 6a to 6d, medium-temperature-measuring resistor 8, first circuit resistor 9, and second circuit resistor 10 are made in the form of thin bands having predetermined conductance (resistance values), from a polycrystalline or monocrystalline silicon semiconductor thin film that is highly doped with phosphor (P) or boron (B).

After throughholes (not shown) are formed in the dielectric membrane, thin film pads made of aluminum (Al) or gold (Au) are formed on the terminal electrodes 11.

The measured medium 7 may be air, hydrogen, nitrogen, oxygen, carbon dioxide, city gas, methane, propane, butane, or water vapor. In the present example, the measured medium 7 is assumed to be air.

Figure 2:
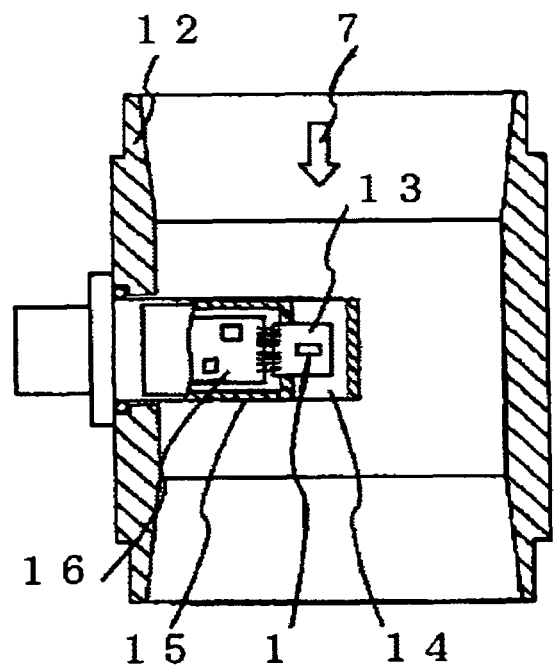
FIG. 2 shows an example of the mounted state of the sensor element of the thermal flow meter according to the embodiment of the invention.

FIG. 2 shows a cross section of an embodiment of the sensor element 1 of FIG. 1 mounted in an intake passage 12 of an internal combustion engine of an automobile, for example. In this case, the sensor element 1 is contained in a support 13, and is disposed in a sub-passage 14 inside the intake passage 12 together with a support 15 and an external circuit 16. Thus, the external circuit 16 is electrically connected with the terminal electrodes 11 (FIG. 1) of the sensor element 1 via the support 15.

The intake air to the internal combustion engine normally flows in the direction indicated by arrow 7 (forward flow). While it may flow in the opposite direction to arrow 7 (backward flow) depending on the operating condition of the engine, airflow can be correctly measured for both forward flow and backward flow according to the present embodiment, in which the direction of the flow can be additionally determined.

Hereafter, a measurement operation involving the thermal flow meter according to this embodiment is described.

Figure 3:
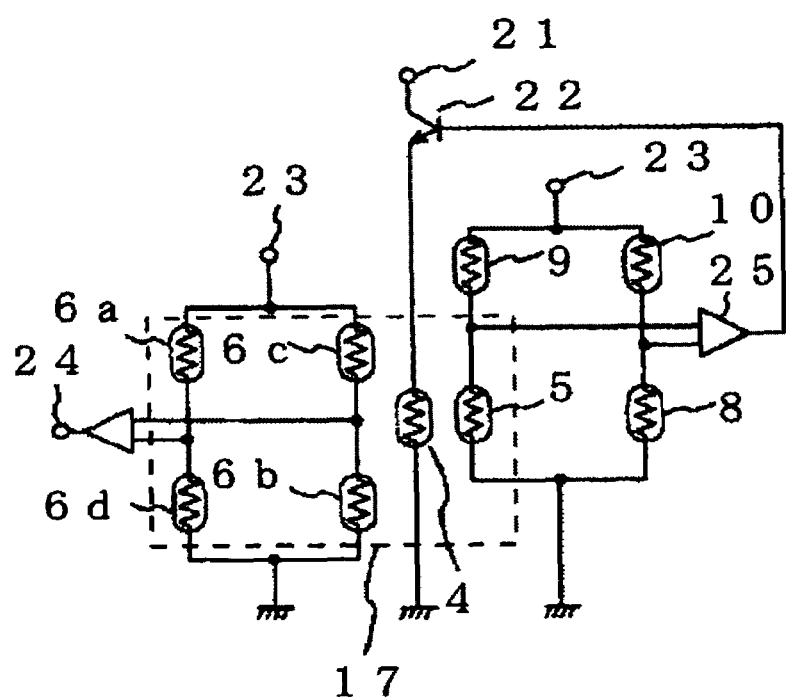
FIG. 3 shows a circuit diagram of the thermal flow meter according to the embodiment of the invention.

FIG. 3 shows a circuit diagram including the sensor element 1 shown in FIG. 1. A heat-generating/temperature-measuring resistor 5 shown in FIG. 3 is connected to other resistors formed in the same semiconductor substrate 2, including the medium-temperature-measuring resistor 8, first circuit resistor 9, and second circuit resistor 10, thereby forming a first bridge circuit. A second bridge circuit is formed by the upstream temperature-measuring resistors 6a and 6b and downstream temperature-measuring resistors 6c and 6d. Numeral 21 designates a power supply such as a battery, 23 a reference voltage source, 24 and 25 differential amplifiers, and 17 the region of the diaphragm portion.

As the heat-generating resistor 4 is cooled by the flow of a fluid, the heat-generating/temperature-measuring resistor 5 that is disposed in proximity is also cooled, whereby the bridge balance is altered. The alteration is feedback-controlled by the differential amplifier 25 and a transistor 22, so as to control the excess temperature (ΔTh=Th−Ta) of the heat-generating resistor 4, namely, the difference between the heating temperature (Th) of the heat-generating resistor and the temperature (Ta) of the measured medium.

The excess temperature (ΔTh) and the heating temperature (Th) of the heat-generating resistor 4 and the heat-generating/temperature-measuring resistor 5, and the temperatures (T) of the temperature-measuring resistors 6a, 6b, 6c, and 6d are defined in terms of average temperatures in each resistor pattern region over the diaphragm portion 3 shown in FIG. 1.

The flow rate and the direction of flow of the medium 7 are measured from the temperature (resistance) difference between the upstream temperature-measuring resistors 6a and 6b and the downstream temperature-measuring resistors 6c and 6d that are provided upstream and downstream, respectively, of the heat-generating resistor 4.

Specifically, when the flow rate is zero, the heating condition due to the heat generated by the heat-generating resistor 4 is the same, so the upstream temperature-measuring resistors 6a and 6b and the downstream temperature-measuring resistors 6c and 6d exhibit the same temperature and therefore there is no temperature difference.

When the flow is in the direction of the arrow 7 (forward flow), the upstream temperature-measuring resistors 6a and 6b provided upstream are subject to a greater cooling effect by the medium flow 7 than the downstream temperature-measuring resistors 6c and 6d. As a result, a temperature difference is caused between the upstream temperature-measuring resistors 6a and 6b and the downstream temperature-measuring resistors 6c and 6d, allowing the flow rate to be measured from this temperature difference.

On the other hand, when the direction is opposite to the arrow 7 (backward flow), this time the temperature of the downstream temperature-measuring resistors 6c and 6d becomes lower than the temperature of the upstream temperature-measuring resistors 6a and 6b. Thus, the sign indicating the temperature difference between the upstream temperature-measuring resistors 6a and 6b and the downstream temperature-measuring resistors 6c and 6d is reversed.

In this way, the flow rate can be measured from the magnitude of temperature difference, while the direction of flow can be determined from the sign of temperature difference.

In the following, the temperature dependency of the resistors and the temperature characteristics of the flow rate signal that is measured are discussed.

Figure 4:
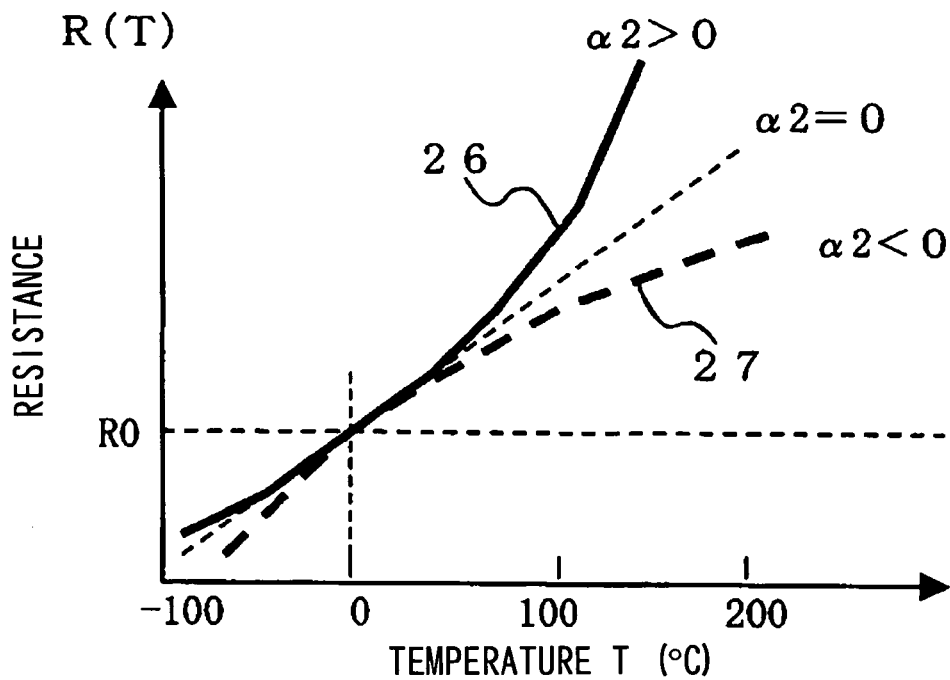
FIG. 4 shows the resistance-temperature characteristics of the thermal flow meter of the invention.

FIG. 4 shows the temperature characteristics of the resistors. Strictly, the temperature characteristics of the resistors are approximated by the quadratic expression according to Equation (1), where the first-order resistor temperature coefficient ($\alpha 1$) assumes a positive value whereas the sign of the second-order resistor temperature coefficient may be either positive or negative depending on the material. In the drawing, the resistance value is R0 when the temperature (T) is 0° C., and the resistance value is R(T) at temperature (T). A curve 27 corresponds to the conventional example using a platinum thin film, where the second-order resistor temperature coefficient ($\alpha 2$) is negative. A curve 26 corresponds to the invention using a polycrystalline or monocrystalline silicon semiconductor thin film that is highly doped with phosphor (P) or boron (B), where the second-order resistor temperature coefficient ($\alpha 2$) is positive.

Thus, when the upstream temperature-measuring resistors 6a and 6b and the downstream temperature-measuring resistors 6c and 6d are formed with resistor materials having different signs of the second-order resistor temperature coefficient ($\alpha 2$), a flow rate signal V(T) from the bridge circuit is strongly influenced by the average temperature (T) of the upstream temperature-measuring resistors 6a and 6b and the downstream temperature-measuring resistors 6c and 6d.

The flow rate signal V(T) is a function of at least the temperature dependency (R(T)) of the resistance of the temperature-measuring resistors, in addition to the excess temperature (ΔTh) of the heat-generating resistor and the temperature dependencies of the thermal conductivity, thermal capacity, and viscosity of the measured medium. It can be approximated by the following equation (2):

$$V(T) \propto (\Delta Th) \times (\Delta R(T)/\Delta T) = (\Delta Th) \times (\alpha 1 + \alpha 2 \times T) \quad (2)$$

Figure 5:
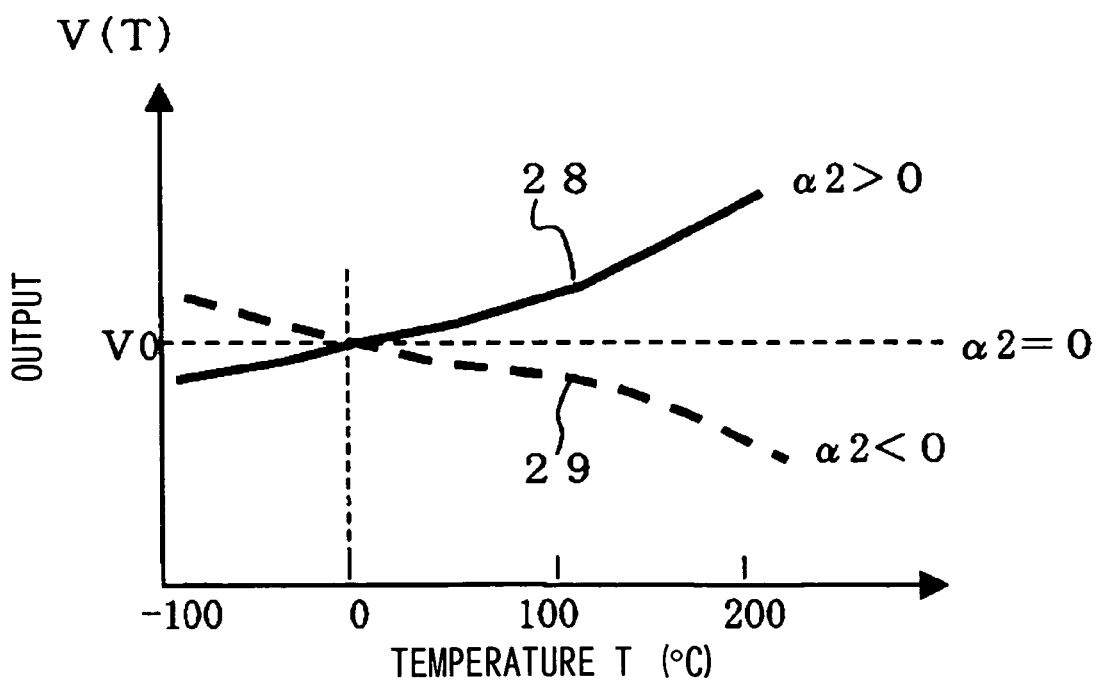
FIG. 5 shows the output-temperature characteristics of the thermal flow meter of the invention.

Thus, as shown in FIG. 5, the flow rate signal V(T) is strongly influenced by the average temperature (T) of the temperature-measuring resistors 6a, 6b, 6c, and 6d. A curve 29 in the figure corresponds to the conventional example with platinum thin film where the second-order resistor temperature coefficient ($\alpha 2$) is negative. A curve 28 corresponds to the invention with a polycrystalline or monocrystalline silicon semiconductor thin film that is highly doped with phosphor (P) or boron (B), where the second-order resistor temperature coefficient ($\alpha 2$) is positive.

As the average temperature (T) of the temperature-measuring resistors 6a, 6b, 6c, and 6d increases, the flow rate signal V(T) decreases in the case of the platinum thin film of the conventional example while it increases in the case of the silicon semiconductor thin film in the invention, thus exhibiting different temperature characteristics. The average temperature (T) of the temperature-measuring resistors 6a, 6b, 6c, and 6d is further approximated by the following equation (3):

$$T \propto Th = Ta + \Delta Th \quad (3)$$

Thus, as the medium temperature (Ta) changes, the flow rate signal V(T) changes, resulting in deterioration of the temperature characteristics.

When applied to automobiles and the like, the medium temperature (Ta) is equal to the atmospheric temperature upon engine start, and the temperature of the intake air is in the range of about −30° C. to 40° C. After warm-up, the intake temperature increases up to approximately 100° C. due to the heat from the engine. Therefore, the thermal flow meter is required to produce no output error in the wide temperature range of about −30° C. to 100° C.

In order to improve the temperature characteristics of the flow rate signal V(T), the medium temperature (Ta) needs to be temperature-compensated. As a means of such temperature compensation, the excess temperature (ΔTh) of the heat-generating resistor can be adjusted with respect to the medium temperature (Ta). As shown by equation (2), the flow rate signal V(T) is proportional to the excess temperature (ΔTh) of the heat-generating resistor. Therefore, the temperature characteristics of the flow rate signal V(T) shown in FIG. 5 only need to be inversely compensated.

Figure 6:
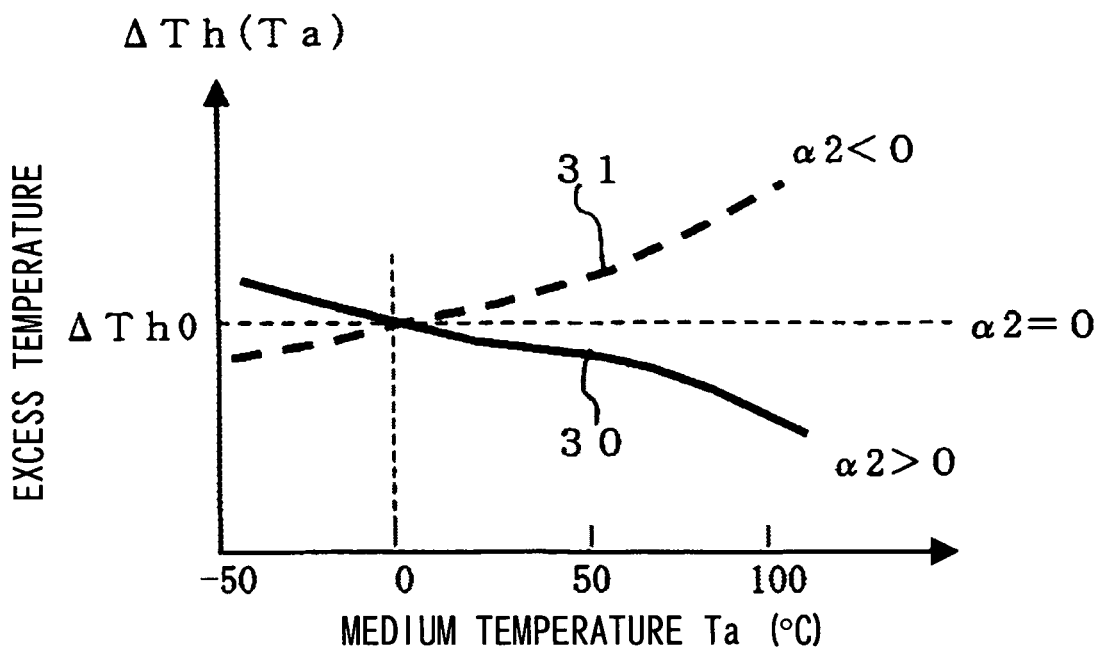
FIG. 6 shows the excess temperature-medium temperature characteristics of the thermal flow meter of the invention.

FIG. 6 shows the medium temperature (Ta) dependency of the excess temperature (ΔTh) of the heat-generating resistor.

In the figure, a curve 31 corresponds to the platinum thin film of conventional example, and a curve 30 correspond to the silicon semiconductor thin film of the invention. In the case of the platinum thin film, the decrease in the flow rate signal V(T) shown by the curve 29 of FIG. 5 can be temperature-compensated by adjusting the excess temperature ($\Delta$Th) of the heat-generating resistor such that it becomes higher as the temperature of the medium temperature (Ta) increases.

On the other hand, in the case of the silicon semiconductor thin film of the invention, the increase in the flow rate signal V(T) shown by the curve 28 of FIG. 5 can be temperature-compensated by adjusting the excess temperature ($\Delta$Th) of the heat-generating resistor inversely, namely, such that the excess temperature ($\Delta$Th) becomes lower as the temperature of the medium temperature (Ta) increases.

Thus, in accordance with the invention, even when the silicon (Si) semiconductor thin film, which is a lower-cost material than platinum thin film, is used, a thermal flow meter can be provided that has good temperature characteristics and is low-cost by adjusting the excess temperature ($\Delta$Th) of the heat-generating resistor to become lower as the medium temperature (Ta) increases.

While a polycrystalline or monocrystalline silicon semiconductor thin film that is highly doped with phosphor (P) or boron (B) has been discussed as the resistor material in the invention, it should be obvious that other materials with a positive second-order resistor temperature coefficient ($\alpha 2$) can be used.

In the conventional example, a bridge circuit is used as a drive circuit for the heat-generating resistor and a detection circuit for the temperature-measuring resistors, where the bridge circuit is comprised of fixed resistors (printed resistors) as well as a platinum resistor. Fixed resistors, however, have variations in resistor temperature coefficients, which causes variations in the heating temperature of the heat-generating resistor and the output signals of the temperature-measuring resistors when the ambient temperature changes, resulting in temperature characteristics variations.

In contrast, in accordance with the invention, the resistors 4, 5, 8, 6a, 6b, 6c, and 6d, as well as all of the bridge resistors in the first circuit resistor 9 and the second circuit resistor 10 in the first and second bridge circuits shown in FIG. 3 are formed of a polycrystalline or monocrystalline silicon semiconductor thin film that is highly doped with phosphor (P) or boron (B) in the same Si semiconductor substrate 2, as shown in FIG. 1.

In this way, the fixed resistors (printed resistors) in the conventional example can be eliminated, whereby the variations in the heating temperature and the output signals of the temperature-measuring resistors upon change in the ambient temperature due to the variations in the resistor temperature coefficients of the fixed resistors, and thus temperature characteristics variations, can be reduced.

The above effect is further described below.

In the heat drive bridge circuit shown in FIG. 3, the heat-generating resistor 4 and the heat-generating/temperature-measuring resistor 5 are disposed in proximity, so they have substantially the same heating temperature (Th). The resistors 5, 8, 9, and 10 of which the bridge circuit is formed are formed from the same silicon semiconductor thin film in one batch and they therefore have the same resistor temperature coefficients $\alpha 1$ and $\alpha 2$.

When the resistance values of the resistors 5, 8, 9, and 10 are R5, R8, R9, and R10, respectively, and their resistance values at T=0° C. are R5', R8', R9', and R10', respectively, the resistance values are as follows:

$$R5=R5'\times(1+\alpha 1\times T+\alpha 2\times T^2) \quad (4)$$

$$R8=R8'\times(1+\alpha 1\times T+\alpha 2\times T^2) \quad (5)$$

$$R9=R9'\times(1+\alpha 1\times T+\alpha 2\times T^2) \quad (6)$$

$$R10=R10'\times(1+\alpha 1\times T+\alpha 2\times T^2) \quad (7)$$

where R5', R8', R9', and R10' are resistance values at an arbitrary temperature T° C.

Because R5 is controlled to have a higher temperature than the medium temperature (Ta) of R8, R9, and R10 by the excess temperature ($\Delta$Th), equation (4) can be expressed by the following:

$$R5=R5'\times(1+\alpha 1\times(Ta+\Delta Th)+\alpha 2\times(Ta+\Delta Th)^2) \quad (4)'$$

The balancing condition of the heat drive bridge circuit can be expressed by the following equation (8):

$$R5/R9=R8/R10 \quad (8)$$

Substituting equations (4)', (5), (6), and (7) into equation (8) yields the following equation (9):

$$(1+\alpha 1\times(Ta+\Delta Th)+\alpha 2\times(Ta+\Delta Th)^2)=(R8'\times R9')/(R5'\times R10')\times(1+\alpha 1\times Ta+\alpha 2\times Ta^2) \quad (9)$$

From equation (9), the excess temperature ($\Delta$Th) between the heat-generating resistor 4 and the heat-generating/temperature-measuring resistor 5 at the medium temperature (Ta) can be controlled by the ratio of each resistor (R8'×R9')/(r5'×R10') at 0° C. The ratio of each resistor (R8'×R9')/(R5'×R10') can be set by the shape of the planar resistor patterns shown in FIG. 1 since the resistors are formed with the same material in one batch and hence with the same material characteristics and film thickness.

By using the silicon semiconductor thin film with a positive second-order resistor temperature coefficient ($\alpha 2$), it is possible to adjust the excess temperature ($\Delta$Th) between the heating resistor 4 and the heat-generating/temperature-measuring resistor 5 such that it becomes lower as the medium temperature (Ta) increases, as shown by the curve 30 of FIG. 6.

In accordance with the invention, the individual resistors are formed with the same material in the same process, so that, when the resistors are patterned in a resistor forming process, a resistor ratio can be obtained substantially in accordance with the mask measurements with hardly any variations. The formation of all of the resistors in the same substrate also ensure that there are hardly any variations in resistor temperature coefficients. When resistors were actually patterned using semiconductor process and their resistor ratio was measured, variations were less than ±0.07%. It was also learned that, while the absolute lot-to-lot variations of resistor temperature coefficients are on the order of ±1%, they can be reduced to substantially zero within the same lot and in the same semiconductor substrate 2.

In the conventional example, the adjustment of the heating temperature of the heating resistor is made by laser trimming the fixed resistors (printed resistors). In the present invention, this adjustment process can be eliminated and thus a cost reduction can be achieved. Furthermore, even when the resistors change over time, the change will be identical because they are subject to thermal history under the same environmental conditions. As a result, their resistance ratio can be maintained and no change is caused in the bridge balance, thereby preventing the change in the excess temperature ($\Delta$Th) of the heat-generating resistor.

In the following, a process for manufacturing a sensor element of the thermal flow meter of the embodiment is described.

First, a silicon dioxide ($SiO_2$) layer is formed on the upper and lower surfaces of the silicon semiconductor substrate 2 by thermal oxidation process. Then, a silicon nitride ($Si_3N_4$)

thin film is formed by the low-pressure CVD (Chemical Vapor Deposition) process (to be hereafter referred to as "LPCVD process").

A silicon dioxide ($SiO_2$) layer is further formed on this upper layer by the LPCVD process. Thus, there is formed a multilayer structure consisting of a silicon dioxide ($SiO_2$) layer and a silicon nitride ($Si_3N_4$) thin film where the heat expansion coefficients and residual stresses are matched. In this way, deflection due to the thermal stress and residual stress in the diaphragm portion 3 can be reduced and an improvement can be achieved in strength.

Then, a polycrystalline silicon (Si) semiconductor thin film is formed on the above dielectric membrane by the LPCVD process and the like, to the thickness of about 1 micron. While a polycrystalline silicon (Si) semiconductor thin film is used in the present example, a silicon (Si) semiconductor thin film of monocrystalline structure may be formed through epitaxial growth.

The thus formed silicon (Si) semiconductor thin film is then doped with impurities by thermal diffusion process. Specifically, phosphor glass (POC13) is formed on the surface of the silicon (Si) semiconductor thin film which is then thermally processed at 1000° C. for more than 30 minutes, thereby forming a silicon (Si) semiconductor thin film that has been highly doped with phosphor (P) with a resistivity ($\rho$) of $8\times10^{-4}$ $\Omega$cm or less.

While phosphor (P) is used in this step, it is also possible to use boron (B) as impurity for the high-concentration doping process. However, as far as the stability (change over time) of the resistance value of the silicon semiconductor thin film that is formed is concerned, better effects can be obtained by using phosphor (P) as impurity.

Thereafter, a resist with a predetermined shape is formed by known photolithography technique, and then the silicon (Si) semiconductor thin film is patterned by reactive dry etching, for example, so as to form individual resistors. In this step, the resistors are formed in a pattern as shown in FIG. 1 such that their resistance ratio is uniquely determined.

Furthermore, a silicon dioxide ($SiO_2$) layer, a silicon nitride ($Si_3N_4$) thin film, and a silicon dioxide ($SiO_2$) layer are stacked in the same manner as described above. After thermal annealing, throughholes are formed at predetermined positions in the dielectric membrane. Terminal electrodes 11 are then formed with aluminum or gold and the like, and electrical connection between the terminal electrodes and the resistors are provided.

In order to form a cavity in the silicon semiconductor substrate 2, an etching mask material is patterned into a predetermined shape. Only those portions of the semiconductor substrate 2 that are to be etched are then exposed using the mask, and anisotropic etching is conducted on the back surface of the silicon semiconductor substrate 2, using an etch solution such as potassium hydroxide (KOH), for example, thereby forming a cavity.

In the final step of the semiconductor manufacturing process, after the terminal electrodes 11 are formed with aluminum or gold and the like, thermal annealing is conducted so as to improve the film quality of the electrode material such as aluminum or gold and to ensure their electrical connection.

In the thus manufactured sensor element 1, because its resistivity ($\rho$) of the resistors is set to be $8\times10^{-4}$ $\Omega$cm or less by the high-concentration doping of phosphor (P) or boron (B), positive and relatively large values can be obtained for the resistor temperature coefficients $\alpha 1$ and $\alpha 2$ of each resistor. Thus, a thermal flow meter that has good temperature characteristics and little variations can be provided at low cost.

Figure 7:
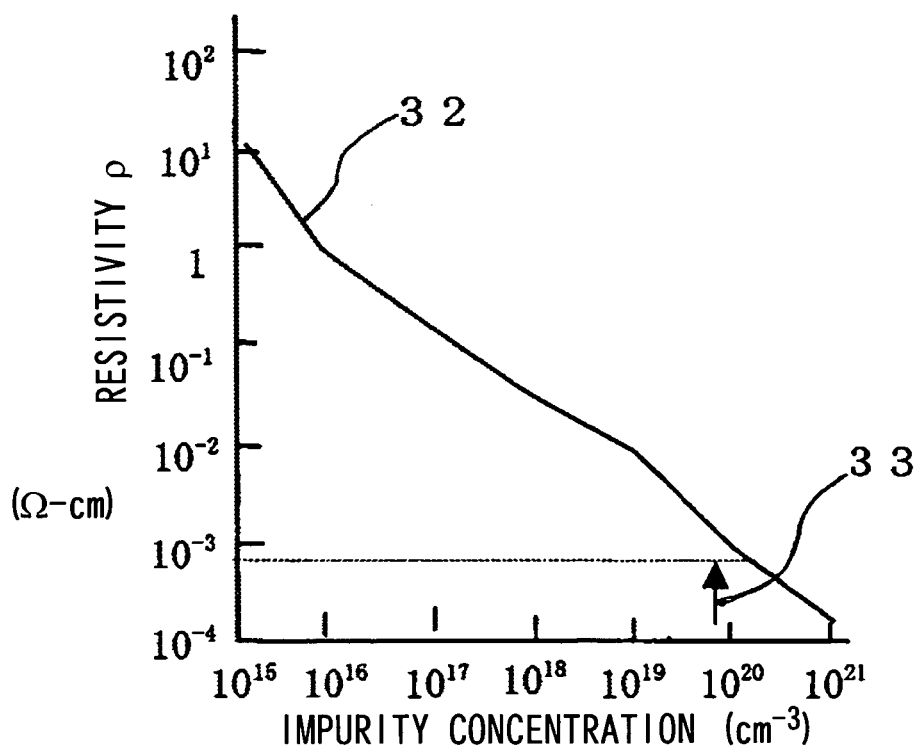
FIG. 7 shows the characteristics regarding the resistivity and the impurity concentration of the resistor in the thermal flow meter of the invention.
Figure 8:
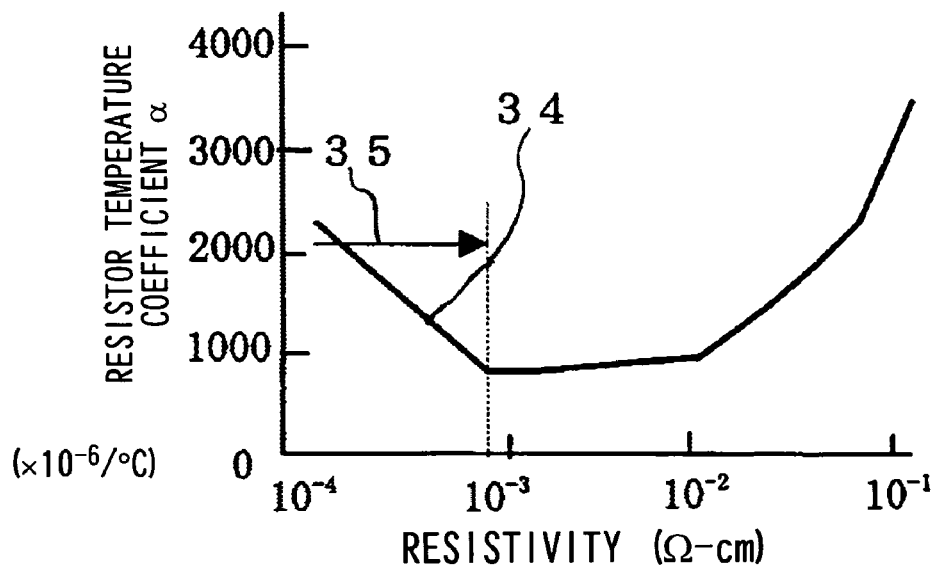
FIG. 8 shows the characteristics regarding the resistivity and resistor temperature coefficient of the resistor in the thermal flow meter of the invention.

FIG. 7 shows the relationship between the resistivity ($\rho$) and concentration of impurity of the silicon (Si) semiconductor thin film. FIG. 8 shows the relationship between the resistor temperature coefficient ($\alpha$) and resistivity ($\rho$) of the silicon (Si) semiconductor thin film.

Although silicon (Si) semiconductor thin films generally exhibit thermistor-like resistance-temperature characteristics, they exhibit metallic resistance-temperature characteristics when the temperature range is relatively narrow and they are highly doped with impurities.

Particularly, the resistor temperature coefficients of the resistors are preferably large from the viewpoint of enhancing detection sensitivity. The resistivity ($\rho$) of the heat-generating resistor 4 is preferably small from the viewpoint of reducing the voltage for driving the heat-generating resistor when heating it to a desired temperature (such as 200° C.).

Particularly, in order to decrease the resistance value of the heat-generating resistor 4, the film thickness of the silicon (Si) semiconductor film could be increased. Increasing the film thickness, however, makes it more difficult to etch a desired pattern with high accuracy, and is not preferable in terms of material cost as well. The limit of the film thickness of the polycrystalline silicon (Si) semiconductor film with which etching can be performed with high accuracy is approximately 1 micron. The resistance value of the heat-generating resistor 4 with such thickness at which it can be driven with the drive voltage of 10V or lower is 1 k$\Omega$ or less. Thus, a region 33 of FIG. 7 where the impurity concentration is $2\times10^{20}(cm^{-3})$ or greater and the resistivity ($\rho$) is $8\times10^{-4}$ $\Omega$cm or less is selected.

Regarding the relationship 34 between the resistor temperature coefficient ($\alpha$) and the resistivity ($\rho$) shown in FIG. 8, the resistor temperature coefficient ($\alpha$) increases in a region 35 where the resistivity ($\rho$) is $8\times10^{-4}$ $\Omega$cm or less.

Thus, in the region 35 in FIG. 7 where the resistivity ($\rho$) is $8\times10^{-4}$ cm or less, large resistor temperature coefficients can be realized at a low resistivity ($\rho$). The resistor temperature coefficients in this region are such that $\alpha 1=1000$ to 2000 (ppm/° C.), and $\alpha 2=0.1$ to 2 (ppm/(° C.)$^2$), both of which are positive values.

In contrast, the resistor temperature coefficients of platinum thin film in the conventional example are such that $\alpha 1=2000$ to 3900 (ppm/° C.), and $\alpha 2=-0.1$ to $-1$ (ppm/(° C.)$^2$). Thus, while $\alpha 1$ is a positive value, $\alpha 2$ exhibits a negative value, which is opposite to the sign of the above-described silicon (Si) semiconductor film.

The resistance value of the heat-generating resistor 4 according to the present embodiment was selected to be 50 to 900$\Omega$ and the resistance values of the temperature-measuring resistors 6a to 6d and 8 were selected to be 1 to 10 k$\Omega$ in consideration of the relationship between power supply voltage and the amount of heat generated.

Thus, in accordance with the invention, a thermal flow meter that has good temperature characteristics with little variations can be provided at low cost.

While the heating temperature (Th) of the heat-generating resistor 4 has been described to be detected by the heat-generating/temperature-measuring resistor 5 disposed in proximity, it is obvious that the same effect can be obtained by detecting the heating temperature (Th) directly from the resistance value of the heat-generating resistor 4.

Furthermore, while a silicon (Si) semiconductor film has been described as the material for the resistors, it is obvious that the same effect can be obtained with other materials as long as the second-order resistor temperature coefficient α2 exhibits a positive value.

Furthermore, while the upstream and downstream temperature-measuring resistors 6a to 6d have been described to be comprised of two pairs of temperature-measuring resistors for the upstream and downstream respectively, it is obvious that the same effect can be obtained with a pair of such resistors for the upstream and downstream respectively.

Figure 9:
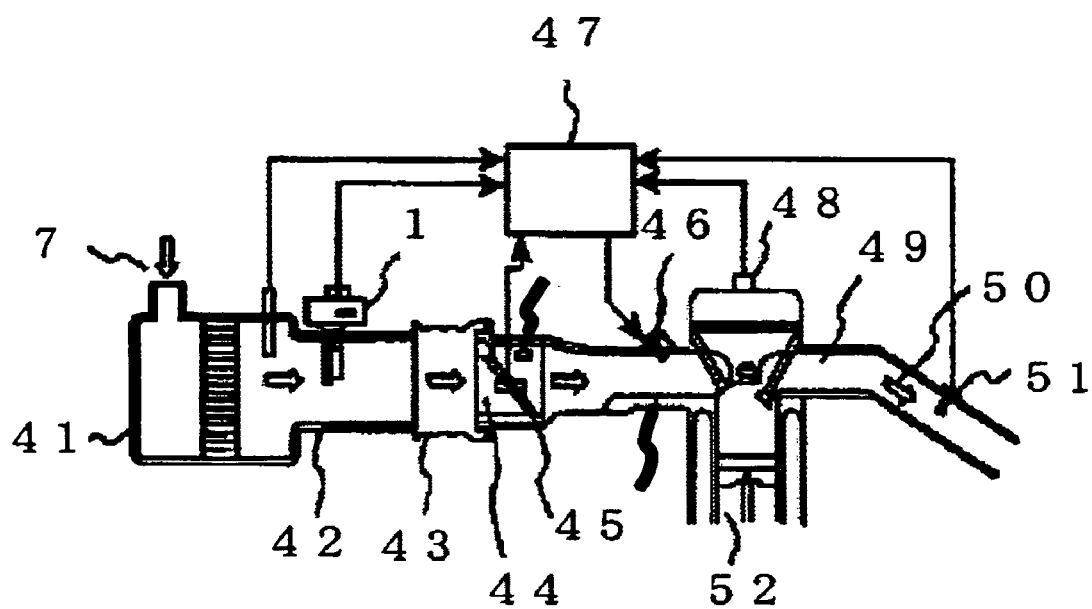
FIG. 9 shows a system chart of an internal combustion engine according to the invention.
Figure 10:
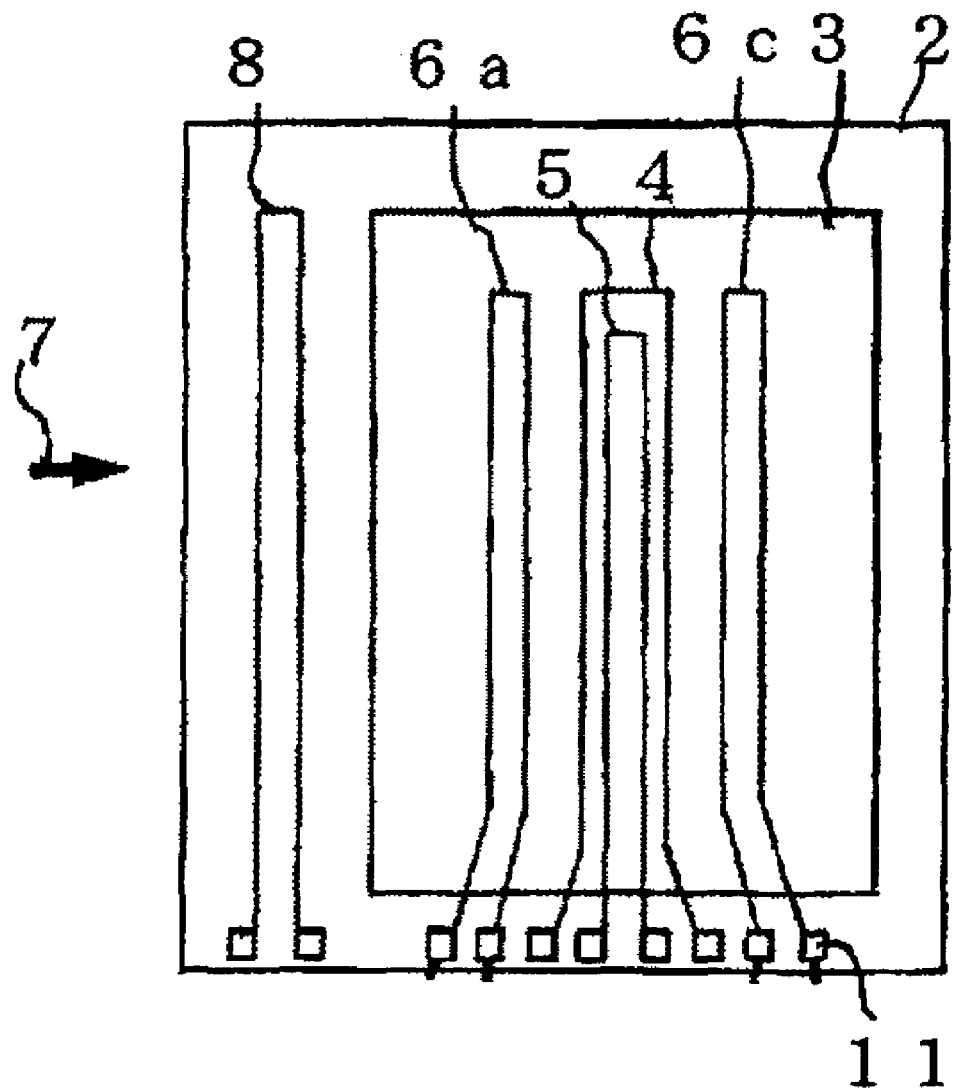
FIG. 10 shows a plan view of a sensor element according to a conventional example.

FIG. 9 shows an embodiment involving an internal combustion engine, particularly a gasoline engine.

Intake air 7 to the engine flows through an intake passage including an air cleaner 41, a body 42, a duct 43, a throttle 45, and a throttle body 44. The flow rate of the intake air 7 is detected by the thermal flow meter 1 of the invention at some point in the passage or in a bypass passage. A flow rate signal in the form of voltage or frequency signal is fed to a control unit 47 which controls a combustion unit structure formed by an injector 46, ignition plug 48, engine cylinder 52, exhaust manifold 49, exhaust gas 50, and oxygen concentration meter 51, as well as subsystems.

The basic structure is substantially identical in the case of a diesel engine, and so the invention can also be applied to such engine. Namely, flow rate is detected with the thermal flow meter of the invention that is disposed at a point between the air cleaner and the intake manifold of the diesel engine, with the resultant signal being fed to the control unit.

In recent years, research is being actively carried out for propane-gas vehicles and natural-gas vehicles, or vehicles driven by electric motors powered by fuel cells using hydrogen and oxygen as fuels, pushed by the demands from society for stricter exhaust gas emission regulation and prevention of air pollution, for example. The thermal flow meter of the invention can also be applied to these technologies in systems for detecting relevant flow rates and controlling fuel supply amounts correctly.

What is claimed is:

1. A thermal fluid flow meter comprising:
   a sensor element positioned in the flow of a measured medium, said sensor element having at least one heat-generating resistor and at least two temperature-measuring resistors, said heat-generating resistor being disposed such that it can heat said temperature-measuring resistors, wherein at least one of said temperature-measuring resistors is an upstream temperature-measuring resistor positioned upstream of said heat-generating resistor and at least one of said temperature-measuring resistors is a downstream temperature-measuring resistor positioned downstream of said heat-generating resistor;
   an evaluation means that forms a sensor signal by measuring a signal that is based on a temperature difference between said upstream temperature-measuring resistor and said downstream temperature-measuring resistor; and
   an adjusting means for adjusting an excess temperature ($\Delta Th = Th - Ta$) of said heat-generating resistor, which is the difference between the temperature (Ta) of said measured medium and the temperature (Th) of said heat-generating resistor,
   wherein said adjusting means adjusts the excess temperature ($\Delta Th$) of said heat-generating resistor based on at least the temperature dependency of the resistance of said temperature-measuring resistors, such that the adjusted excess temperature of said heat-generating resistor depends on the temperature (Ta) of said measured medium, and such that the adjusted excess temperature becomes lower as the temperature (Ta) of said measured medium increases.

2. The thermal fluid flow meter according to claim 1, wherein the temperature dependency of the resistance of at least said temperature-measuring resistor is approximated by a quadratic expression according to the following equation (1):

$$R(T) = R(0^\circ C.) \times (1 + \alpha 1 \times T + \alpha 2 \times T^2) \quad (1)$$

where a first-order resistor temperature coefficient ($\alpha 1$) and a second-order resistor temperature coefficient ($\alpha 2$) are both positive.

3. The thermal fluid flow meter according to claim 2, wherein the temperature dependencies of the resistances of said heat-generating resistor, temperature-measuring resistor, heat-generating/temperature-measuring resistor, medium-temperature-measuring resistor, and circuit resistors are approximated by the quadratic expression according to equation (1), and wherein the resistors are formed from the same thin film resistor of which the first-order resistor temperature coefficient ($\alpha 1$) and the second-order resistor temperature coefficient ($\alpha 2$) are both positive.

4. The thermal fluid flow meter according to claim 3, wherein said thin film resistor comprises a silicon (Si) semiconductor thin film highly doped with impurities that are either phosphor (P) or boron (B).

5. The thermal fluid flow meter according to claim 4, wherein said silicon (Si) semiconductor thin film is highly doped such that its resistivity is $8 \times 10^{-4}$ Ωcm or less.

6. The thermal fluid flow meter according to claim 1, wherein said adjusting means comprises a heat-generating/temperature-measuring resistor for measuring the temperature of said heat-generating resistor.

7. The thermal fluid flow meter according to claim 1, wherein said adjusting means comprises a medium-temperature-measuring resistor for measuring the temperature of said measured medium.

8. The thermal fluid flow meter according to claim 1, wherein said adjusting means comprises circuit resistors of which at least a bridge circuit is formed.

9. An engine system comprising:
   an engine;
   the thermal fluid flow meter according to claim 1 installed on an intake pipe of said engine;
   a fuel supply means for supplying fuel to said engine; and
   a control means for controlling said fuel supply means based on the output of said thermal fluid flow meter.

* * * * *